(12) United States Patent
Qin et al.

(10) Patent No.: US 12,168,580 B2
(45) Date of Patent: Dec. 17, 2024

(54) CARRIER DEVICE AND PLACEMENT MACHINE

(71) Applicant: HKC CORPORATION LIMITED, Shenzhen (CN)

(72) Inventors: Lin Qin, Shenzhen (CN); Chongwei Tang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 775 days.

(21) Appl. No.: 17/372,167

(22) Filed: Jul. 9, 2021

(65) Prior Publication Data
US 2022/0033198 A1 Feb. 3, 2022

(30) Foreign Application Priority Data

Jul. 28, 2020 (CN) .......................... 202010742690.3
Jul. 28, 2020 (CN) .......................... 202021527540.2

(51) Int. Cl.
*B65G 47/91* (2006.01)
*B25J 15/00* (2006.01)
(Continued)

(52) U.S. Cl.
CPC ........ *B65G 47/914* (2013.01); *B25J 15/0052* (2013.01); *B25J 15/0616* (2013.01);
(Continued)

(58) Field of Classification Search
CPC ................ B65G 47/914; B65G 49/061; B65G 2249/04; B25J 9/0093; B25J 15/0052; B25J 15/0616
See application file for complete search history.

(56) References Cited

U.S. PATENT DOCUMENTS 4,200,420 A * 4/1980 Cathers .................... B65H 9/00
414/793
4,228,993 A * 10/1980 Cathers ................ B65G 49/068
198/750.12
(Continued)

FOREIGN PATENT DOCUMENTS

CN 204284128 U 4/2015
CN 205870579 U 1/2017
(Continued)

OTHER PUBLICATIONS

First Office Action issued in counterpart Chinese Patent Application No. 202010742690.3, dated Aug. 17, 2024.

*Primary Examiner* — Gene O Crawford
*Assistant Examiner* — Keith R Campbell
(74) *Attorney, Agent, or Firm* — Westbridge IP LLC

(57) ABSTRACT

A carrier device and a placement machine, where the carrier device includes a body and a positioner. A positioning sucker mechanism is disposed on the body, and a sliding sucker mechanism is slidably disposed on the body, where the sliding sucker mechanism includes a sucker group, a positioning block connected to one end of the sucker group, and a first suction piece provided on the positioning block. The positioner is arranged on one side of the body and adjacent to the positioning block, and includes a driver and a clamping assembly connected to the driver, where the clamping assembly is provided with a second suction piece mutually attracted to the first suction piece.

20 Claims, 6 Drawing Sheets

(51) Int. Cl.
   *B25J 15/06*      (2006.01)
   *B65G 49/06*      (2006.01)
   *B25J 9/00*       (2006.01)

(52) U.S. Cl.
   CPC .......... *B65G 49/061* (2013.01); *B25J 9/0093* (2013.01); *B65G 2249/04* (2013.01)

(56) References Cited

U.S. PATENT DOCUMENTS

| | | | | | |
|---|---|---|---|---|---|
| 5,336,029 | A | * | 8/1994 | Kato | B65G 47/914 414/217 |
| 5,387,068 | A | * | 2/1995 | Pearson | B25J 15/0616 414/404 |

FOREIGN PATENT DOCUMENTS

| | | |
|---|---|---|
| CN | 210284747 U | 4/2020 |
| CN | 210478069 U | 5/2020 |
| CN | 212711645 U | 3/2021 |

* cited by examiner

CARRIER DEVICE AND PLACEMENT MACHINE

CROSS REFERENCE TO RELATED APPLICATIONS

The present disclosure claims priority to Chinese Patent Application No. 202010742690.3, filed on Jul. 28, 2020 and entitled "Carrier Device and Placement Machine", and Chinese Patent Application No. 202021527540.2, filed on Jul. 28, 2020 and entitled "Carrier Device and Placement Machine", the entirety of which are hereby incorporated herein by reference.

TECHNICAL FIELD

The present disclosure relates to the technical field of display assembly equipment, and in particular to a carrier device and a placement machine using the carrier device.

BACKGROUND

When a polarizer is attached on a display panel, a gripper is used to clamp a sucker to move, so that the sucker corresponds to the polarizer and sucks the polarizer to achieve the bonding of the display panel and the polarizer. When the gripper is aligned with the sucker, the gripper moves towards the sucker at a certain speed, and the collision between the gripper and the sucker produces a reaction force; due to the reaction force, there is displacement between the gripper and the sucker, resulting in multiple times of alignment of the gripper approaching the sucker before the gripper grips the sucker. This results in low efficiency of the gripper gripping the sucker, which affects the production efficiency of the display.

The above content is only used to help understand the technical solution of this disclosure, and does not mean that the above content is recognized as prior art.

SUMMARY

The main object of the present disclosure is to provide a carrier device, which aims to solve the technical problem of low positioning efficiency of the gripper and the sucker.

In order to achieve the above object, the carrier device provided in the present disclosure includes:

a body, a positioning sucker mechanism being disposed on the body, and a sliding sucker mechanism being slidably disposed on the body, where the sliding sucker mechanism includes a sucker group, a positioning block connected to one end of the sucker group, and a first suction piece provided on the positioning block; and a positioner, arranged on one side of the body and adjacent to the positioning block, and including a driver and a clamping assembly connected to the driver, where the clamping assembly is provided with a second suction piece mutually attracted to the first suction piece;

where the driver is configured for driving the clamping assembly to approach the positioning block, the first suction piece and the second suction piece are mutually attracted, and the positioning block is clamped by the clamping assembly.

In an embodiment of the present disclosure, the body includes a rotating motor assembly and a main body connected to the rotating motor assembly, the main body includes at least two suction planes, each suction plane is provided with the positioning sucker mechanism and the sliding sucker mechanism movable close to or far away from the positioning sucker mechanism; and where the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

In an embodiment of the present disclosure, the main body includes four suction planes, and two adjacent suction planes are arranged at a right angle.

In an embodiment of the present disclosure, the clamping assembly includes a mounting platform connected to the driver, a first gripper and a second gripper, the first gripper is provided on a side of the mounting platform facing the body, the second gripper is rotatably connected to the mounting platform, and the first gripper is provided with the second suction piece facing the second gripper; and the driver is configured for driving the mounting platform to approach the positioning block, the first suction piece and the second suction piece are mutually attracted, and the second gripper is rotated so that the positioning block is clamped by the second gripper and the first gripper.

In an embodiment of the present disclosure, the first gripper includes a positioning arm connected to the mounting platform and the second suction piece provided on the positioning arm; and the second gripper comprises a swing arm driver connected to the mounting platform and a swing arm connected to the swing arm driver, and the swing arm driver is configured for driving the swing arm to rotate toward the positioning arm to cooperate with the positioning arm to clamp the positioning block.

In an embodiment of the present disclosure, the positioning arm is further provided with a positioning wheel at an end away from the mounting platform, and the swing arm is provided with a pressing wheel at an end away from the mounting platform, the swing arm driver is configured for driving the swing arm to rotate toward the positioning arm, so that the positioning block is clamped by the positioning wheel and the pressing wheel.

In an embodiment of the present disclosure, the first gripper further includes a telescopic driver connected to the mounting platform, the telescopic driver is connected to the positioning arm and is configured for driving the positioning arm to extend or retract relative to the positioning block.

In an embodiment of the present disclosure, the first suction piece and the second suction piece are arranged directly opposite when the positioning block is clamped by the pressing wheel and the positioning wheel.

In an embodiment of the present disclosure, a separation distance between the first suction piece and the second suction piece is defined as D when the positioning block is clamped by the pressing wheel and the positioning wheel, where 2 mm≥D≥0.5 mm.

In an embodiment of the present disclosure, one of the first suction piece and the second suction piece is made of magnetic material, and the other one of the first suction piece and the second suction piece is made of iron material.

The present disclosure further provides a carrier device, including:

a body, including a rotating motor assembly and a main body connected to the rotating motor assembly, where the main body includes at least two suction planes, each suction plane is provided with a positioning sucker mechanism and a sliding sucker mechanism movable close to or far away from the positioning sucker mechanism, the sliding sucker mechanism includes a sucker group, a positioning block connected to one end of the sucker group, and a first suction piece provided on the positioning block; and a positioner, arranged on one side of the body and adjacent to the positioning block, and including a driver and a clamping assembly connected to the driver, where the clamping assembly is provided with a second suction piece;

where the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

The present disclosure further provides a placement machine, including a conveyor belt mechanism and the carrier device, and the conveyor belt mechanism is arranged opposite to the body.

In an embodiment of the present disclosure, the body includes a rotating motor assembly and a main body connected to the rotating motor assembly, the main body includes at least two suction planes, each suction plane is provided with the positioning sucker mechanism and the sliding sucker mechanism movable close to or far away from the positioning sucker mechanism; and where the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

In an embodiment of the present disclosure, the main body includes four suction planes, and two adjacent suction planes are arranged at a right angle.

In an embodiment of the present disclosure, the clamping assembly includes a mounting platform connected to the driver, a first gripper and a second gripper, the first gripper is provided on a side of the mounting platform facing the body, the second gripper is rotatably connected to the mounting platform, and the first gripper is provided with the second suction piece facing the second gripper; and the driver is configured for driving the mounting platform to approach the positioning block, the first suction piece and the second suction piece are mutually attracted, and the second gripper is rotated so that the positioning block is clamped by the second gripper and the first gripper.

In an embodiment of the present disclosure, the first gripper includes a positioning arm connected to the mounting platform and the second suction piece provided on the positioning arm; and the second gripper comprises a swing arm driver connected to the mounting platform and a swing arm connected to the swing arm driver, and the swing arm driver is configured for driving the swing arm to rotate toward the positioning arm to cooperate with the positioning arm to clamp the positioning block.

In an embodiment of the present disclosure, the positioning arm is further provided with a positioning wheel at an end away from the mounting platform, and the swing arm is provided with a pressing wheel at an end away from the mounting platform, the swing arm driver is configured for driving the swing arm to rotate toward the positioning arm, so that the positioning block is clamped by the positioning wheel and the pressing wheel.

In an embodiment of the present disclosure, the first gripper further includes a telescopic driver connected to the mounting platform, the telescopic driver is connected to the positioning arm and is configured for driving the positioning arm to extend or retract relative to the positioning block.

In an embodiment of the present disclosure, the first suction piece and the second suction piece are arranged directly opposite when the positioning block is clamped by the pressing wheel and the positioning wheel.

In an embodiment of the present disclosure, a separation distance between the first suction piece and the second suction piece is defined as D when the positioning block is clamped by the pressing wheel and the positioning wheel, where 2 mm≥D≥0.5 mm.

According to the present disclosure, the sliding sucker mechanism includes a sucker group and a first suction piece arranged at one end of the sucker group. The body is provided with a driver and a clamping assembly provided on the driver at one side, and the clamping assembly is provided with a second suction piece. It is understandable that, when the driver drives the clamping assembly to move to the sucker group and the clamping assembly touches the sucker group, since the first suction piece and the second suction piece are mutually attracted, the displacement caused by the clamping assembly touching the sucker assembly can be reduced, thereby improving the efficiency of the clamping assembly clamping the sucker assembly. On the other hand, the first suction piece is arranged on the positioning block, and then the positioning block is arranged on one end of the sucker group, that is, the positioning block is taken as a booster to improve the connection stability between the first suction piece and the sucker group.

BRIEF DESCRIPTION OF THE DRAWINGS

In order to more clearly describe the technical solutions in the embodiments of this disclosure or the related art, the following will briefly introduce the drawings that need to be used in the description of the embodiments or the related art. Obviously, the drawings in the following description are only some embodiments of this disclosure. For those of ordinary skill in the art, without creative work, other drawings can be obtained according to the structures shown in these drawings.

Figure 1:
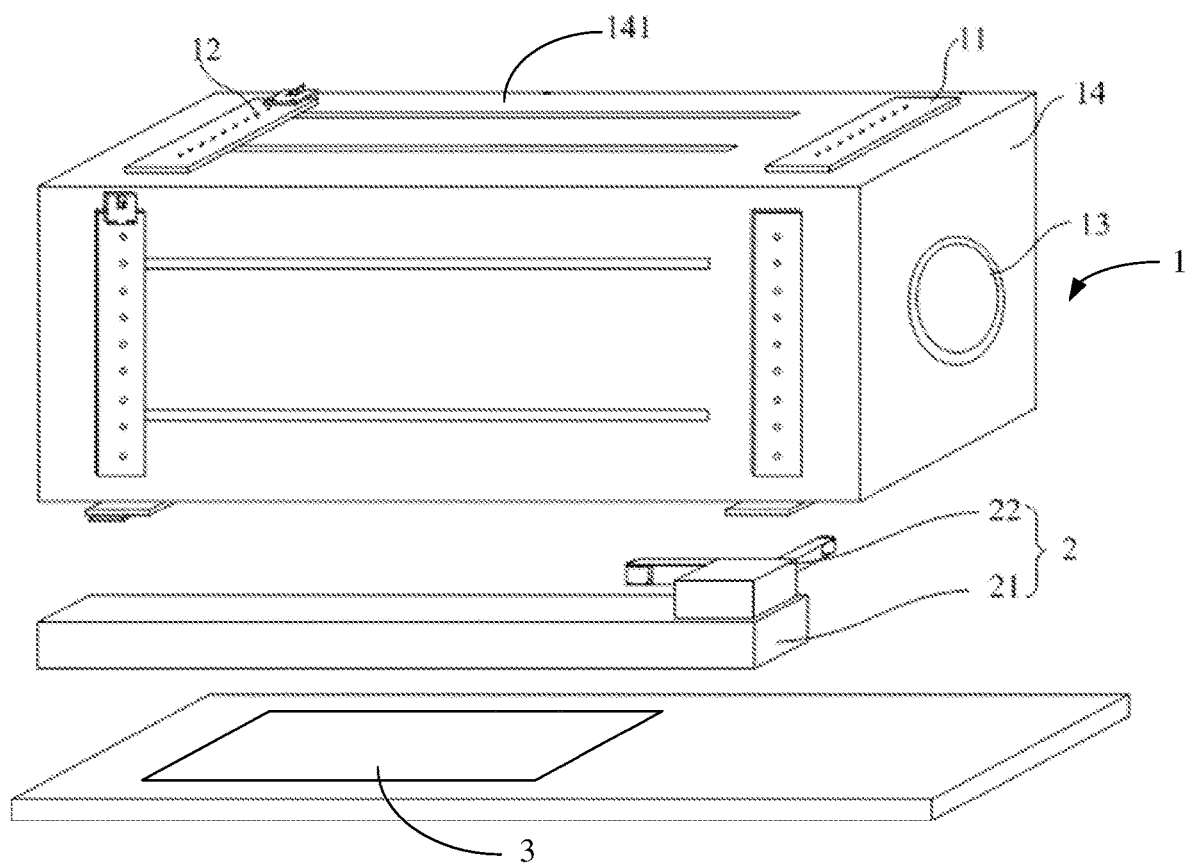
FIG. 1 is a schematic structural diagram of a carrier device according to an embodiment of the present disclosure.

The realization of the object, functional characteristics, and advantages of this disclosure will be further described in conjunction with the embodiments and with reference to the accompanying drawings.

DETAILED DESCRIPTION OF THE EMBODIMENTS

The technical solutions in the embodiments of this disclosure will be described clearly and completely in conjunction with the drawings in the embodiments of this disclosure. Obviously, the described embodiments are only a part of the embodiments of this disclosure, but not all the embodiments. Based on the embodiments in this disclosure, all other embodiments obtained by those of ordinary skill in the art without making creative efforts fall within the protection scope of this disclosure.

It should be noted that if there is a directional indication (such as up, down, left, right, front, back . . . ) in the embodiment of this disclosure, the directional indication is only used to explain the relative positional relationship, movement conditions, etc. among the components in a specific posture (as shown in the drawings), if the specific posture changes, the directional indicator also changes accordingly.

In addition, if there are descriptions related to "first", "second", etc. in the embodiments of the present disclosure, the descriptions of "first", "second", etc. are only used for descriptive purposes, and cannot be understood as instructions or implications Its relative importance or implicitly indicates the number of technical features indicated. Thus, the features defined as "first" and "second" may include at least one of the features either explicitly or implicitly. In addition, the meaning of "and/or" appearing throughout the text is that it includes three side-by-side solutions, taking "A and/or B" as an example, it includes solution A, or solution B, or solution that A and B meet at the same time. In addition, the technical solutions between the various embodiments can be combined with each other, but they must be based on the ability of those skilled in the art to realize. When the combination of technical solutions conflicts with each other or cannot be realized, it should be considered that the combination of such technical solutions does not exist, nor within the scope of protection required by this disclosure.

Figure 2:
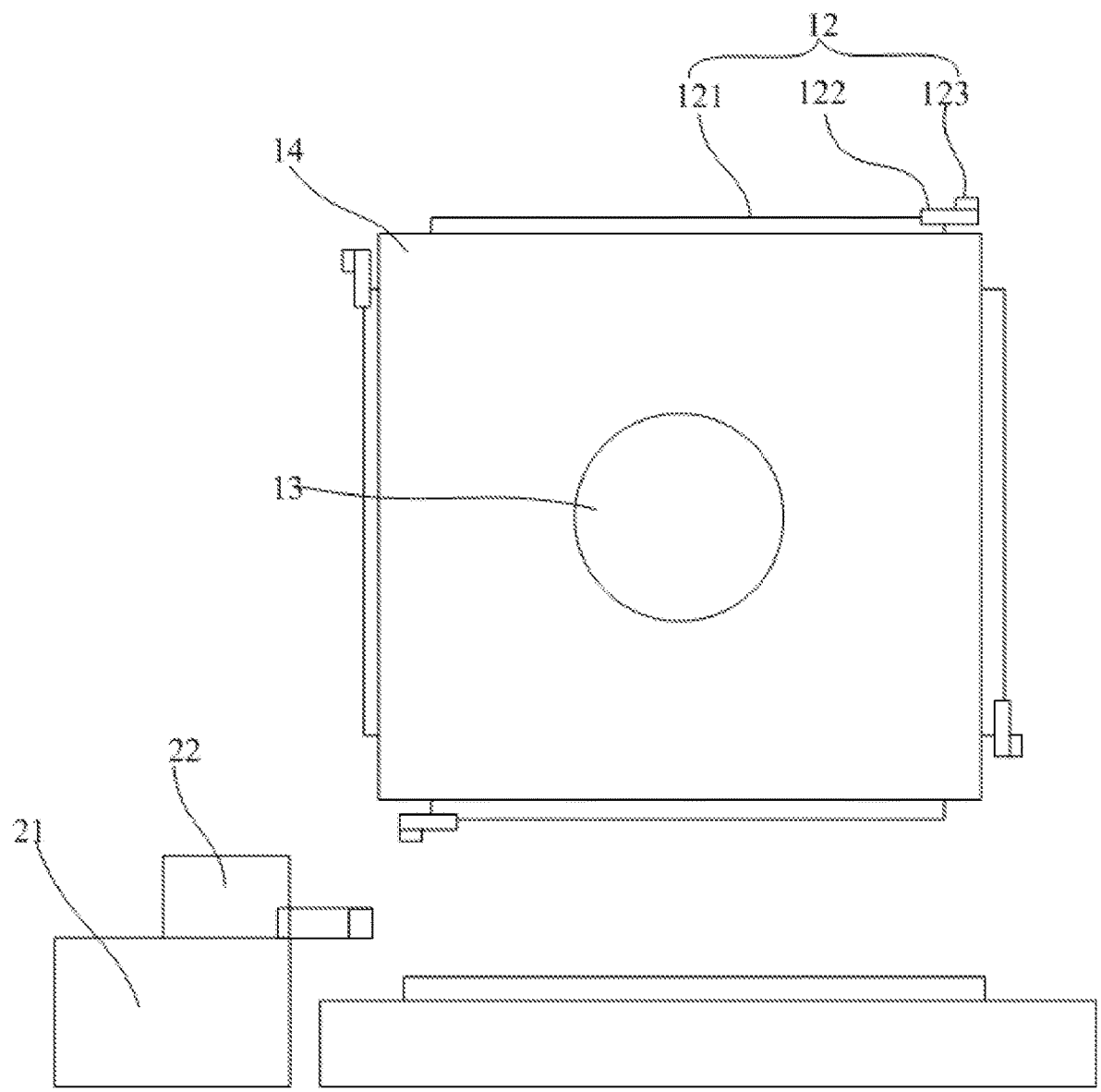
FIG. 2 is a schematic structural diagram of the carrier device in FIG. 1 from another perspective.
Figure 3:
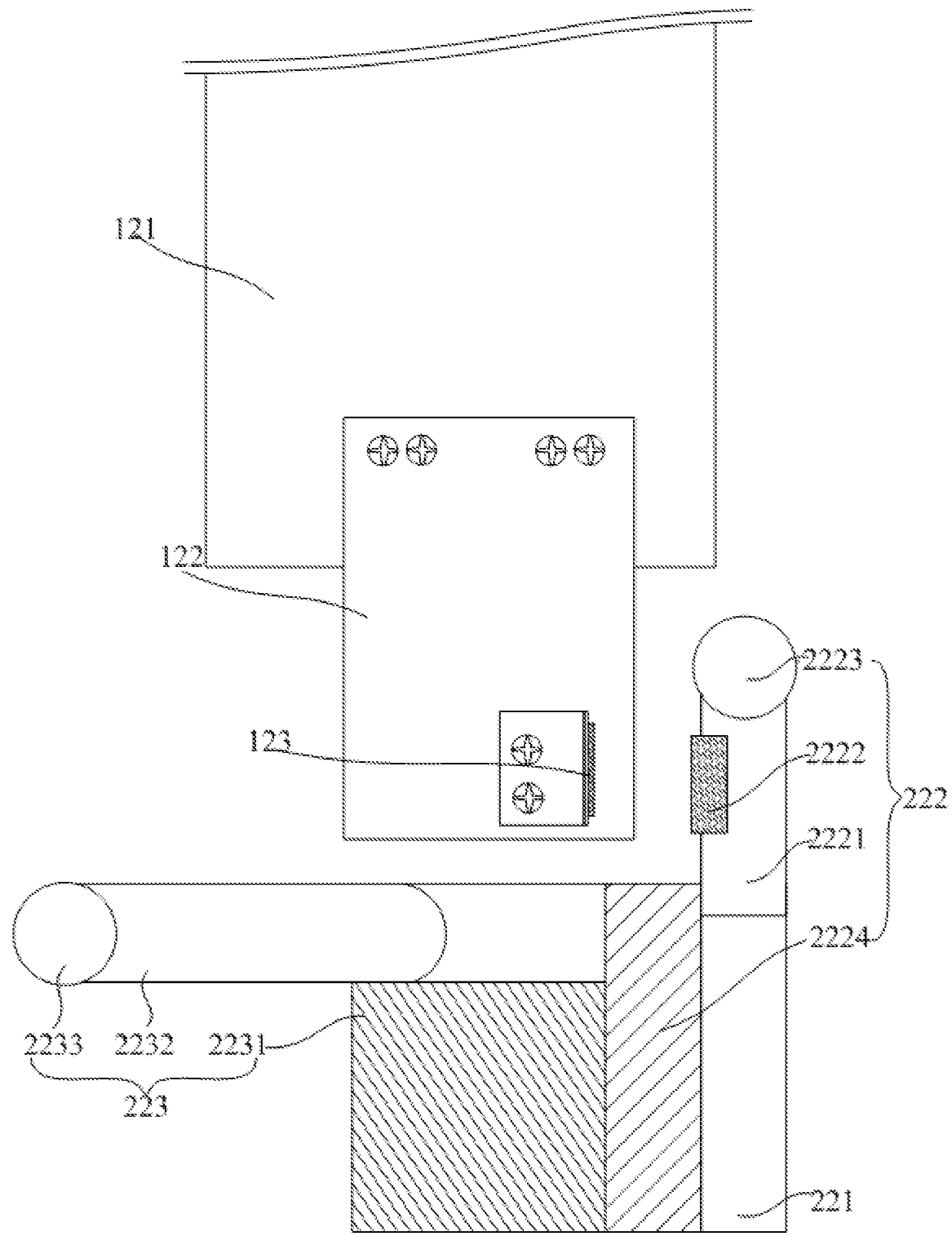
FIG. 3 is an enlarged view of a part of the carrier device in FIG. 1.
Figure 4:
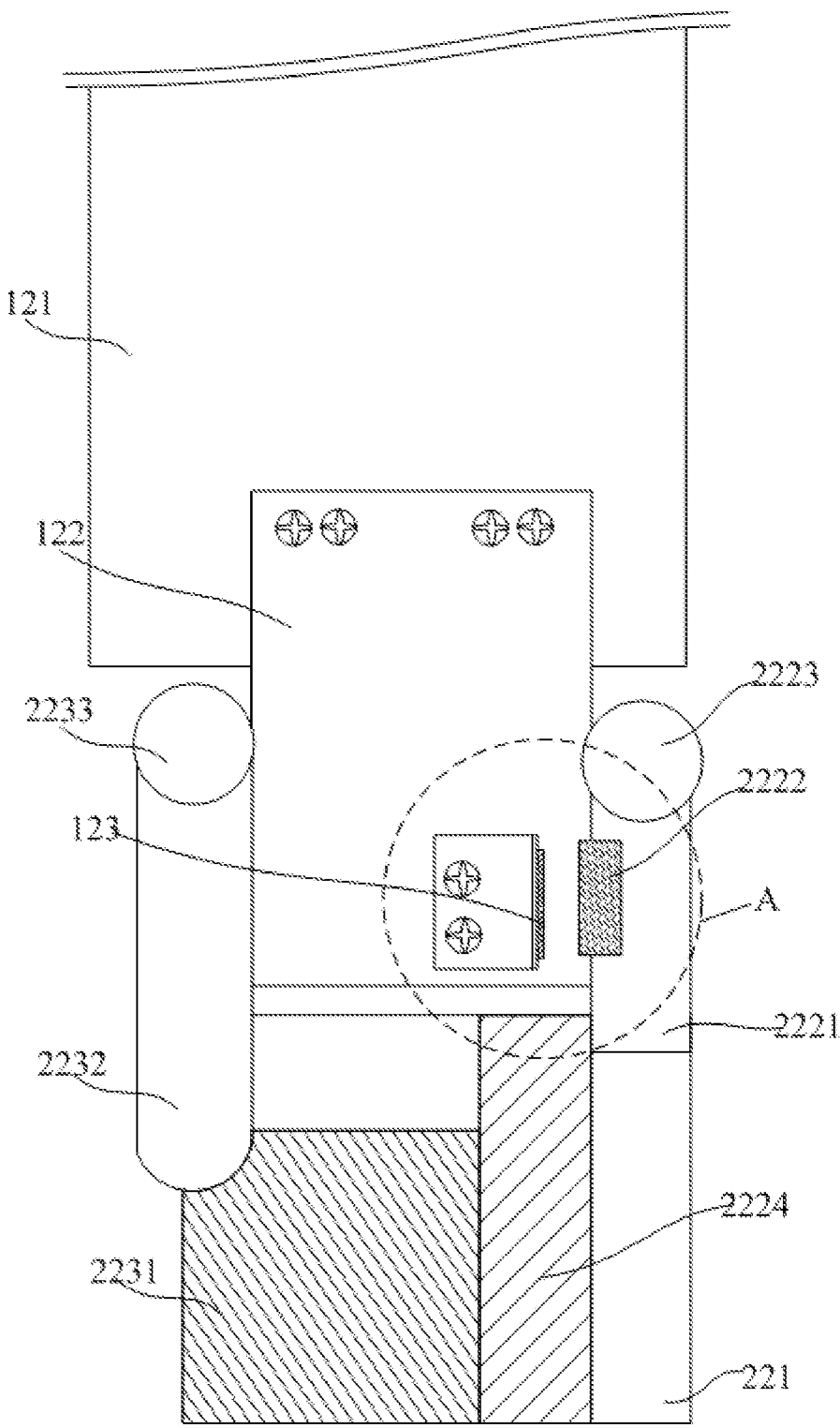
FIG. 4 is a schematic structural diagram of another state of the part of the carrier device in FIG. 3.
Figure 5:
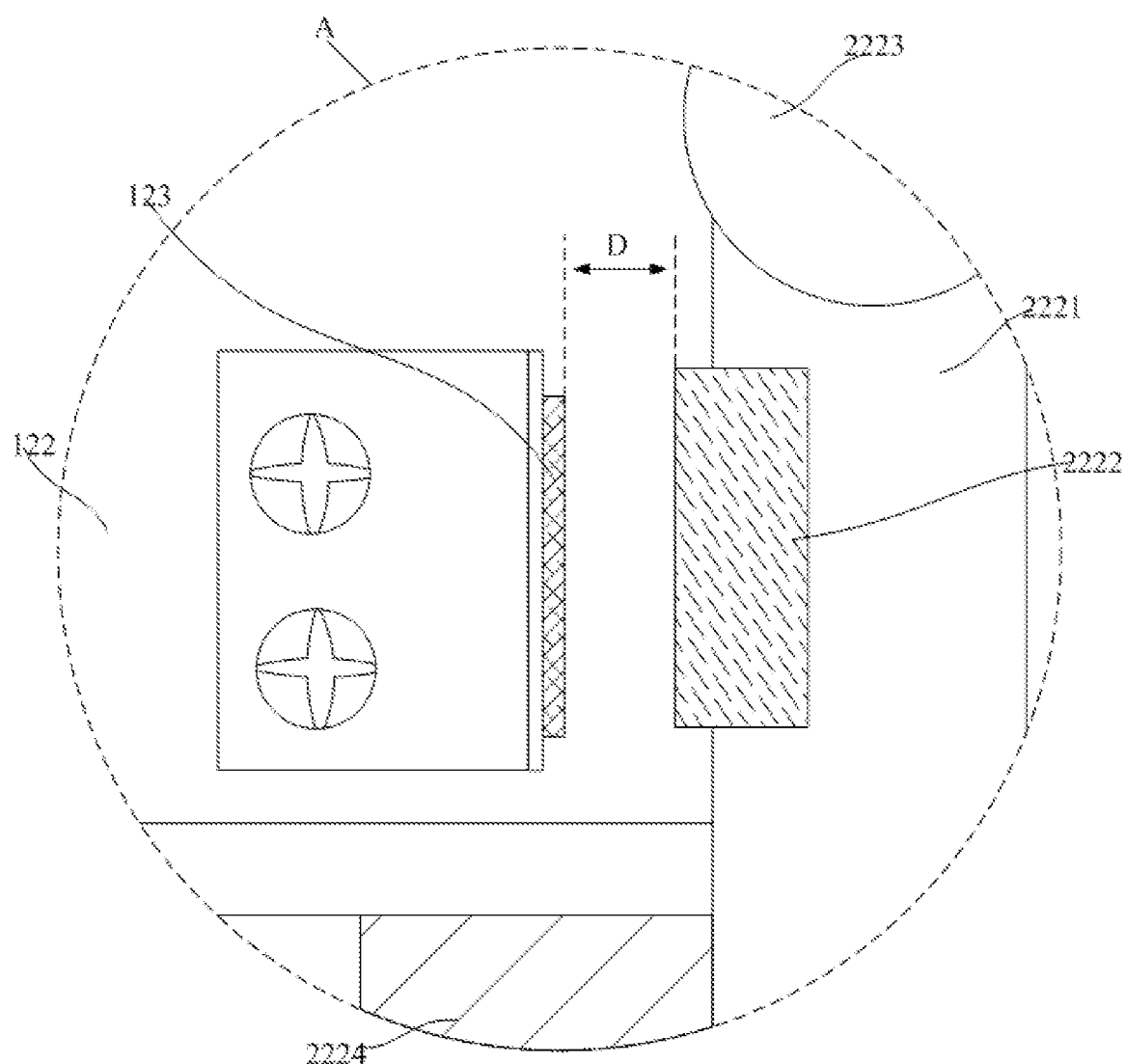
FIG. 5 is a partial enlarged view of A in FIG. 4.
Figure 6:
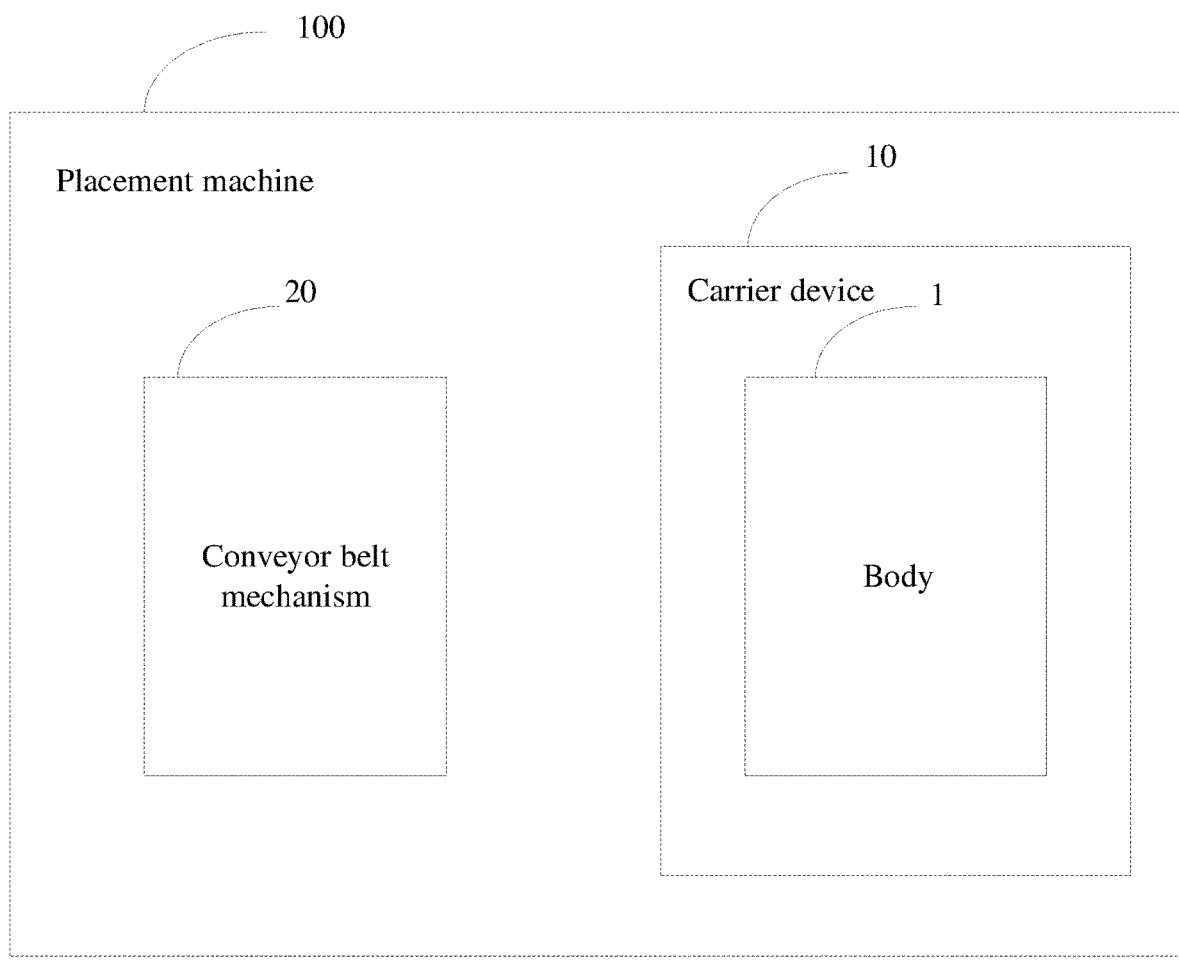
FIG. 6 is a structural diagram of a placement machine according to an embodiment of the present disclosure.

The present disclosure provides a carrier device. FIG. 1 is a schematic structural diagram of a carrier device according to an embodiment of the present disclosure. FIG. 2 is a schematic structural diagram of the carrier device in FIG. 1 from another perspective. FIG. 3 is an enlarged view of a part of the carrier device in FIG. 1. FIG. 4 is a schematic structural diagram of another state of the part of the carrier device in FIG. 3. FIG. 5 is a partial enlarged view of A in FIG. 4. FIG. 6 is a structural diagram of a placement machine according to an embodiment of the present disclosure.

In an embodiment of the present disclosure, as shown in FIG. 1 in combination with FIG. 2, FIG. 3 and FIG. 4, the carrier device, configured for carrying a workpiece 3, includes: a body 1 and a positioner 2.

A positioning sucker mechanism 11 is disposed on the body 1, and a sliding sucker mechanism 12 is slidably disposed on the body 1. The sliding sucker mechanism 12 is movable close to or away from the positioning sucker mechanism 11. The sliding sucker mechanism 12 includes a sucker group 121, a positioning block 122 connected to one end of the sucker group 121, and a first suction piece 123 provided on the positioning block 122.

The positioner 2 is arranged on one side of the body 1 and adjacent to the positioning block 122, and includes a driver 21 and a clamping assembly 22 connected to the driver 21, where the clamping assembly 22 is provided with a second suction piece 2222 mutually attracted to the first suction piece 123.

The driver 21 drives the clamping assembly 22 to approach the positioning block 122, the first suction piece 123 and the second suction piece 2222 are mutually attracted, and the clamping assembly 22 clamps the positioning block 122 to position a distance of the sliding sucker mechanism 12 relative to the positioning sucker mechanism 11.

In this disclosure, the sliding sucker mechanism 12 includes a sucker group 121 and a first suction piece 123 arranged at one end of the sucker group 121. The body 1 is provided with a driver 21 and a clamping assembly 22 provided on the driver 21 at one side, and the clamping assembly 22 is provided with a second suction piece 2222. It is understandable that, when the driver 21 drives the clamping assembly 22 to move to the sucker group 121 and the clamping assembly 22 touches the sucker group 121, since the first suction piece 123 and the second suction piece 2222 are mutually attracted, the displacement caused by the clamping assembly 22 touching the sucker assembly 121 can be reduced, thereby improving the efficiency of the clamping assembly 22 clamping the sucker assembly 121. On the other hand, the first suction piece 123 is arranged on the positioning block 122, and then the positioning block 122 is arranged on one end of the sucker group 121, that is, the positioning block 122 is taken as a booster to improve the connection stability between the first suction piece 123 and the sucker group 121.

In order to suck the workpiece 3 by the sliding sucker mechanism 12 and the positioning sucker mechanism 11, the body 1 may be provided with an air source assembly, which is in pipeline communication with the sliding sucker mechanism 12 and the positioning sucker mechanism 11, so that the sliding sucker mechanism 12 and the positioning sucker mechanism 11 generates negative pressure to suck the workpiece 3. The air source assembly may include at least one cylinder.

In order to drive the clamping assembly 22 to move smoothly by the driver 21, the driver 21 includes a base, a stator arranged on the base and a mover slidably arranged on the base, and the mover is close to or far away from the stator. That is, the clamping assembly 22 is provided on the mover, and the mover is linked with the clamping assembly 22, so that the clamping assembly 22 may move along one side of the body 1 to clamp the positioning block 122. Understandably, the mover can be a sliding plate, and the stator can be a motor or a cylinder.

In order to clamp the positioning block 122 more stably, the clamping assembly 22 includes a clamping cylinder and a gripper, so the clamping cylinder is arranged on the mover of the driver 21, and the mover drives the clamping cylinder to move along one side of the body 1. When the gripper touches the positioning block 122, the clamping cylinder drives the gripper to clamp the positioning block 122. On the other hand, in order to avoid the situation that the sliding sucker mechanism 12 is far away from the gripper due to the contact between the gripper and the positioning block 122, the second suction piece 2222 may be provided on the gripper; or, the second suction piece 2222 may also be provided on the clamping cylinder, which is not limited here, as long as the second suction piece 2222 and the first suction piece 123 can mutually attracted when the clamping assembly 22 is close to the positioning block 122.

In order to achieve mutual attraction between the first suction piece 123 and the second suction piece 2222. It is understandable that, the first suction piece 123 and/or the second suction piece 2222 are made of magnetic material; or, one of the first suction piece 123 and the second suction piece 2222 is made of magnetic material, and the other one of the first suction piece 123 and the second suction piece 2222 is made of iron material.

In order to reduce the collision between the gripper and the positioning block 122, a buffer material may be provided on the gripper to reduce the force generated by the collision between the gripper and the positioning block 122.

In order to realize the sliding sucker mechanism 12 approaching or moving away from the positioning sucker mechanism 11 to realize the smooth sliding of the sliding sucker mechanism 12, a guiding structure can be provided between the sliding sucker mechanism 12 and the body 1. It is understandable that one of the sliding sucker mechanism 12 and the body 1 is provided with a sliding rail, and the other one of the sliding sucker mechanism 12 and the body 1 is provided with a sliding groove, and the sliding rail is slidably connected to a groove wall of the sliding groove to realize smooth sliding of the sliding sucker mechanism 12 on the body 1. It is understandable that, in order to further realize the smooth sliding of the sliding sucker mechanism 12, a pair of guide structures are provided between the sliding sucker mechanism 12 and the body 1, and the two guide structures are arranged in parallel.

In order to enhance the attractive force between the first suction piece 123 and the second suction piece 2222, a plurality of first suction pieces 123 and/or second suction pieces 2222 may be provided according to actual conditions.

In the practical application of the embodiments of the present application, the workpiece 3 is transferred from an opposite side of the sliding sucker mechanism 12. That is, the workpiece 3 is transferred from one end of the body 1. The driver 21 drives the clamping assembly 22 to approach the sliding sucker mechanism 12, and the clamping assembly 22 touches and clamps the positioning block 122. The driver 21 then drives the sliding sucker mechanism 12 close to or far from the positioning sucker mechanism 11, so that the sliding sucker mechanism 12 is separated from the positioning sucker mechanism 11 by a predetermined distance. After that, the clamping assembly 22 loosens the positioning block 122 and resets, and the sliding sucker mechanism 12 cooperates with the positioning sucker mechanism 11 to suck the workpiece 3.

It is understandable that, the workpiece 3 has a planar structure; where, the workpiece 3 can be a polarizer.

In an embodiment of the present disclosure, the clamping assembly 22 includes a mounting platform 221 connected to the driver 21, a first gripper 222 and a second gripper 223, the first gripper 222 is provided on a side of the mounting platform 221 facing the body 1, the second gripper 223 is rotatably connected to the mounting platform 221, and the first gripper 222 is provided with the second suction piece 2222 facing the second gripper 223.

The driver 21 is configured for driving the mounting platform 221 to approach the positioning block 122, the first suction piece 123 and the second suction piece 2222 are mutually attracted, and the second gripper 223 is rotated so that the positioning block 122 is clamped by the second gripper 223 and the first gripper 222.

It is understandable that, a direction in which the clamping assembly 22 moves toward the positioning sucker mechanism 11 is defined as a positioning direction, a direction in which the mounting platform 221 moves along the positioning direction is defined as a positive direction, a side surface of the mounting platform 221 facing the positive direction of the positioning direction is defined as a windward surface, and a side surface of the mounting platform 221 opposite to the windward surface is defined as a leeward surface. The first gripper 222 is disposed adjacent to the leeward surface, and the second gripper 223 is disposed adjacent to the windward surface. That is, when the second gripper 223 rotates toward the first gripper 222, the second gripper 223 and the first gripper 222 cooperates to define a clamping space, and the positioning block 122 is clamped in the clamping space.

On the other hand, in order to facilitate mutual attraction between the first suction piece 123 and the second suction piece 2222, the second suction piece 2222 is disposed on a side surface of the first gripper 222 facing the second gripper 223. That is, when the driver 21 drives the clamping assembly 22 to approach the positioning block 122, the first suction piece 123 and the second suction piece 2222 are in parallel and attracted to each other, and then the first gripper 222 and the second gripper 223 clamp the positioning block 122.

In an embodiment of the present disclosure, the first gripper 222 includes a positioning arm 2221 connected to the mounting platform 221 and the second suction piece 2222 provided on the positioning arm 2221.

The second gripper 223 includes a swing arm driver 2231 connected to the mounting platform 221 and a swing arm 2232 connected to the swing arm driver 2231, and the swing arm driver 2231 is configured for driving the swing arm 2232 to rotate toward the positioning arm 2221 to cooperate with the positioning arm 2221 to clamp the positioning block 122. It is understandable that, the swing arm driver 2231 is a cylinder or a motor.

That is, the swing arm driver 2231 drives the swing arm 2232 to rotate toward the positioning arm 2221, and a clamping space is defined between the swing arm 2232 and the positioning arm 2221, so that the swing arm 2232 and the positioning arm 2221 clamp the positioning block 122. It is understandable that, in order to enhance the stability of the clamping, the swing arm 2232 and the positioning arm 2221 are arranged in parallel.

Optionally, on the premise that the swing arm 2232 and the positioning arm 2221 can smoothly clamp the positioning block 122, opposite surfaces of the swing arm 2232 and the positioning arm 2221 can define a limiting groove structure, so that when the swing arm 2232 and the positioning arm 2221 clamp the positioning block 122, the limiting groove structure can be limited in position with the peripheral edge of the positioning block 122.

In an embodiment of the present disclosure, the positioning arm 2221 is further provided with a positioning wheel 2223 at an end away from the mounting platform 221, and the swing arm 2232 is provided with a pressing wheel 2233 at an end away from the mounting platform 221, the swing arm driver 2231 is configured for driving the swing arm 2232 to rotate toward the positioning arm 2221, so that the positioning block 122 is clamped by the positioning wheel 2223 and the pressing wheel 2233.

In this embodiment, a positioning wheel 2223 is further provided at the end of the positioning arm 2221 away from the mounting platform 221, and a pressing wheel 2233 is provided at the end of the swing arm 2232 away from the mounting platform 221, so that when the positioning wheel 2223 and the pressing wheel 2233 clamp the positioning block 122, the positioning block 122 can have a certain slidable range relative to the positioning wheel 2223 and the pressing wheel 2233 to avoid damage to the equipment. On the other hand, the positioning wheel 2223 and the pressing wheel 2233 can be made of elastic material, that is, the positioning wheel 2223 and the pressing wheel 2233 are taken as buffers to reduce the direct collision between the positioning wheel 2223 and the pressing wheel 2233 and the positioning block 122.

In an embodiment of the present disclosure, the first gripper 222 further includes a telescopic driver 2224 connected to the mounting platform 221, the telescopic driver 2224 is connected to the positioning arm 2221 and is configured for driving the positioning arm 2221 to extend or retract relative to the positioning block 122. It is understandable that, the telescopic driver 2224 is a cylinder or a motor.

In this embodiment, the positioning arm 2221 can be driven by the telescopic driver 2224 to be extended or retracted relative to the positioning block 122, so that the positioning arm 2221 has a wide working range to stably clamp the positioning block 122.

In an embodiment of the present disclosure, the first suction piece 123 and the second suction piece 2222 are arranged directly opposite when the positioning block 122 is clamped by the pressing wheel 2233 and the positioning wheel 2223. That is, when the positioning block 122 is clamped by the pressing wheel 2233 and the positioning wheel 2223, the first suction piece 123 and the second suction piece 2222 are arranged directly opposite, so that the first suction piece 123 and the second suction piece 2222 can have a strong attraction force.

In an embodiment of the present disclosure, referring to FIG. 5, a separation distance between the first suction piece 123 and the second suction piece 2222 is defined as D when the positioning block 122 is clamped by the pressing wheel 2233 and the positioning wheel 2223, where 2 mm≥D≥0.5 mm. A distance of 0.5 mm-2 mm between the first suction piece 123 and the second suction piece 2222 is set, so as to avoid long time touching of the first suction piece 123 and the second suction piece 2222, and to avoid damage of the first suction piece 123 and the second suction piece due to the collision therebetween.

In an embodiment of the present disclosure, one of the first suction piece 123 and the second suction piece 2222 is made of magnetic material, and the other one of the first suction piece 123 and the second suction piece 2222 is made of iron material.

It is understandable that, a mounting frame may be further included between the first suction piece 123 and the positioning block 122, and the mounting frame is configured for fixing the first suction piece 123 on the positioning block 122. That is, the first suction piece 123 is mounted by using the mounting frame as the booster, and the stability of the first suction piece 123 fixed on the positioning block 122 is improved.

The present disclosure further provides a carrier device, configured for carrying a workpiece 3, including: a body 1 and a positioner 2.

The body 1 includes a rotating motor assembly 13 and a main body 14 connected to the rotating motor assembly 13, where the main body 14 includes at least two suction planes 141, each suction plane 141 is provided with a positioning sucker mechanism 11 and a sliding sucker mechanism 12 movable close to or far away from the positioning sucker mechanism 11, the sliding sucker mechanism 12 includes a sucker group 121, a positioning block 122 connected to one end of the sucker group 121, and a first suction piece 123 provided on the positioning block 122.

The positioner 2 is arranged on one side of the body 1 and adjacent to the positioning block 122, and including a driver 21 and a clamping assembly 22 connected to the driver 21, where the clamping assembly 22 is provided with a second suction piece 2222.

The rotating motor assembly 13 is configured for driving the main body 14 to rotate, one of the at least two suction planes 141 is opposite to the workpiece 3, the driver 21 is configured for driving the clamping assembly 22 to approach the positioning block 122, the first suction piece 123 and the second suction piece 2222 are mutually attracted, and the positioning block 122 is clamped by the clamping assembly 22 to drive the sliding sucker mechanism 12 to suck the workpiece 3 to the positioning sucker mechanism 11.

It is understandable that, the main body 14 is provided with at least two suction planes 141, the main body 14 is driven to rotate by the rotating motor assembly 13, so that different suction planes 141 may correspond to the workpiece 3, thereby achieving continuous suction of the workpiece 3, thereby improving equipment production efficiency.

In an embodiment of the present disclosure, the main body 14 includes four suction planes 141, and two adjacent suction planes 141 are arranged at a right angle.

That is, the workpiece 3 is set on a work station, and the main body 14 includes four suction planes 141. At a same time, the suction plane 141 corresponding to the work station is in an attachment position, an upper suction plane 141 adjacent to the attachment position is at a film tearing position, an upper suction plane 141 adjacent to the film tearing position is at a standby position, and an upper suction plane 141 adjacent to the standby position is at a receiving position. It is understandable that, the four suction planes 141 on the main body cooperate with external equipment to realize the receiving, standby and attachment of the workpiece 3, and so on. The external equipment may be a feeding equipment for the workpiece 3, a film tearing equipment for tearing a front side film of the workpiece 3, etc.

Referring to FIG. 6, the present disclosure further provides a placement machine 100, which includes a conveyor belt mechanism 20 and a carrier device 10, and specific structure of the carrier device 10 may refer to the foregoing embodiments. Since the placement machine adopts all the technical solutions of all the above-mentioned embodiments, it has at least all the beneficial effects brought by the technical solutions of the above-mentioned embodiments, which will not be repeated here. Where, the conveyor belt mechanism 20 is arranged opposite to the body 1.

It is understandable that the conveyor belt mechanism 20 transports the workpiece 3, and the positioning sucker mechanism 11 and the sliding sucker mechanism 12 of the body 1 are arranged opposite to the conveyor belt mechanism 20.

In an embodiment of the present disclosure, the conveyor belt mechanism 20 is a device including a conveyor belt.

The above are only the optional embodiments of this disclosure, and therefore do not limit the patent scope of this disclosure. Under the conception of this disclosure, any equivalent structural transformation made by using the content of the description and drawings of this disclosure, or direct/indirect application in other related technical fields are all included in the patent protection scope of this disclosure.

What is claimed is:

1. A carrier device, configured for carrying a workpiece, comprising:
   a body;
   a positioning sucker mechanism disposed on the body;
   a sliding sucker mechanism slidably disposed on the body, the sliding sucker mechanism comprising a sucker group, a positioning block connected to one end of the sucker group, and a first suction piece provided on the positioning block; and a positioner arranged on one side of the body and adjacent to the positioning block, the positioner comprising a driver and a clamping assembly connected to the driver, the clamping assembly being provided with a second suction piece mutually attracted to the first suction piece, wherein the driver is configured for driving the clamping assembly to approach the positioning block, the first suction piece and the second suction piece are mutually attracted, and the positioning block is clamped by the clamping assembly.

2. The carrier device of claim 1, wherein the body comprises a rotating motor assembly and a main body connected to the rotating motor assembly, the main body comprises at least two suction planes, each suction plane is provided with the positioning sucker mechanism and the sliding sucker mechanism movable close to or far away from the positioning sucker mechanism; and wherein the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

3. The carrier device of claim 2, wherein the main body comprises four suction planes, and two adjacent suction planes are arranged at a right angle.

4. The carrier device of claim 1, wherein the clamping assembly comprises a mounting platform connected to the driver, a first gripper and a second gripper, the first gripper is provided on a side of the mounting platform facing the body, the second gripper is rotatably connected to the mounting platform, and the first gripper is provided with the second suction piece facing the second gripper; and the driver is configured for driving the mounting platform to approach the positioning block, the first suction piece and the second suction piece are mutually attracted, and the second gripper is rotated so that the positioning block is clamped by the second gripper and the first gripper.

5. The carrier device of claim 4, wherein the first gripper comprises a positioning arm connected to the mounting platform and the second suction piece provided on the positioning arm; and the second gripper comprises a swing arm driver connected to the mounting platform and a swing arm connected to the swing arm driver, and the swing arm driver is configured for driving the swing arm to rotate toward the positioning arm to cooperate with the positioning arm to clamp the positioning block.

6. The carrier device of claim 5, wherein the positioning arm is further provided with a positioning wheel at an end away from the mounting platform, and the swing arm is provided with a pressing wheel at an end away from the mounting platform, the swing arm driver is configured for driving the swing arm to rotate toward the positioning arm, so that the positioning block is clamped by the positioning wheel and the pressing wheel.

7. The carrier device of claim 6, wherein the first gripper further comprises a telescopic driver connected to the mounting platform, the telescopic driver is connected to the positioning arm and is configured for driving the positioning arm to extend or retract relative to the positioning block.

8. The carrier device of claim 6, wherein the first suction piece and the second suction piece are arranged directly opposite when the positioning block is clamped by the pressing wheel and the positioning wheel.

9. The carrier device of claim 8, wherein a separation distance between the first suction piece and the second suction piece is defined as D when the positioning block is clamped by the pressing wheel and the positioning wheel, where 2 mm≥D≥0.5 mm.

10. The carrier device of claim 1, wherein one of the first suction piece and the second suction piece is made of magnetic material, and the other one of the first suction piece and the second suction piece is made of iron material.

11. A carrier device, configured for carrying a workpiece, comprising:

a body, comprising a rotating motor assembly and a main body connected to the rotating motor assembly, wherein the main body comprises at least two suction planes, each suction plane is provided with a positioning sucker mechanism and a sliding sucker mechanism movable close to or far away from the positioning sucker mechanism, the sliding sucker mechanism comprises a sucker group, a positioning block connected to one end of the sucker group, and a first suction piece provided on the positioning block; and a positioner, arranged on one side of the body and adjacent to the positioning block, and comprising a driver and a clamping assembly connected to the driver, wherein the clamping assembly is provided with a second suction piece;

wherein the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

12. A placement machine, comprising a conveyor belt mechanism and the carrier device as recited in claim 1, wherein the conveyor belt mechanism is arranged opposite to the body.

13. The placement machine of claim 12, wherein the body comprises a rotating motor assembly and a main body connected to the rotating motor assembly, the main body comprises at least two suction planes, each suction plane is provided with the positioning sucker mechanism and the sliding sucker mechanism movable close to or far away from the positioning sucker mechanism; and wherein the rotating motor assembly is configured for driving the main body to rotate, one of the at least two suction planes is opposite to the workpiece, the driver is configured for driving the clamping assembly to approach the positioning block, the first suction piece and the second suction piece are mutually attracted, and the positioning block is clamped by the clamping assembly to drive the sliding sucker mechanism to suck the workpiece to the positioning sucker mechanism.

14. The placement machine of claim 13, wherein the main body comprises four suction planes, and two adjacent suction planes are arranged at a right angle.

15. The placement machine of claim 12, wherein the clamping assembly comprises a mounting platform connected to the driver, a first gripper and a second gripper, the first gripper is provided on a side of the mounting platform facing the body, the second gripper is rotatably connected to the mounting platform, and the first gripper is provided with the second suction piece facing the second gripper; and the driver is configured for driving the mounting platform to approach the positioning block, the first suction piece and the second suction piece are mutually attracted, and the second gripper is rotated so that the positioning block is clamped by the second gripper and the first gripper.

16. The placement machine of claim 15, wherein the first gripper comprises a positioning arm connected to the mounting platform and the second suction piece provided on the positioning arm; and the second gripper comprises a swing arm driver connected to the mounting platform and a swing arm connected to the swing arm driver, and the swing arm driver is configured for driving the swing arm to rotate toward the positioning arm to cooperate with the positioning arm to clamp the positioning block.

17. The placement machine of claim 16, wherein the positioning arm is further provided with a positioning wheel at an end away from the mounting platform, and the swing arm is provided with a pressing wheel at an end away from the mounting platform, the swing arm driver is configured for driving the swing arm to rotate toward the positioning arm, so that the positioning block is clamped by the positioning wheel and the pressing wheel.

18. The placement machine of claim 17, wherein the first gripper further comprises a telescopic driver connected to the mounting platform, the telescopic driver is connected to the positioning arm and is configured for driving the positioning arm to extend or retract relative to the positioning block.

19. The placement machine of claim 17, wherein the first suction piece and the second suction piece are arranged directly opposite when the positioning block is clamped by the pressing wheel and the positioning wheel.

20. The placement machine of claim 19, wherein a separation distance between the first suction piece and the second suction piece is defined as D when the positioning block is clamped by the pressing wheel and the positioning wheel, where 2 mm≥D≥0.5 mm.

* * * * *